United States Patent
Miyabe et al.

(10) Patent No.: US 9,602,194 B2
(45) Date of Patent: Mar. 21, 2017

(54) TRANSMISSION DEVICE, NETWORK DESIGNING DEVICE, ACTIVATION METHOD, AND NETWORK DESIGNING METHOD

(71) Applicant: FUJITSU LIMITED, Kawasaki-shi, Kanagawa (JP)

(72) Inventors: Masatake Miyabe, Kawasaki (JP); Tomohiro Hashiguchi, Inagi (JP); Yutaka Takita, Kawasaki (JP); Kazuyuki Tajima, Yokosuka (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/791,605

(22) Filed: Jul. 6, 2015

(65) Prior Publication Data
US 2016/0036521 A1 Feb. 4, 2016

(30) Foreign Application Priority Data
Aug. 4, 2014 (JP) .................. 2014-158718

(51) Int. Cl.
*G02F 1/00* (2006.01)
*H04B 10/032* (2013.01)
*H04J 3/16* (2006.01)

(52) U.S. Cl.
CPC .......... *H04B 10/032* (2013.01); *H04J 3/1652* (2013.01)

(58) Field of Classification Search
CPC .................................................. H04B 10/032
USPC ........................................................... 398/5
See application file for complete search history.

(56) References Cited

U.S. PATENT DOCUMENTS

| | | | |
|---|---|---|---|
| 7,403,473 B1 * | 7/2008 | Mehrvar | H04L 1/22 370/217 |
| 8,134,920 B2 | 3/2012 | Imajuku et al. | |
| 2002/0003639 A1 * | 1/2002 | Arecco | H04J 14/022 398/59 |
| 2009/0046572 A1 * | 2/2009 | Leung | H04J 14/0227 370/216 |
| 2014/0161437 A1 * | 6/2014 | Miyabe | H04B 10/032 398/5 |

FOREIGN PATENT DOCUMENTS

| | | |
|---|---|---|
| JP | 2003-115872 | 4/2003 |
| JP | 2007-014032 | 1/2007 |
| JP | 2009-201156 | 9/2009 |

* cited by examiner

*Primary Examiner* — Juan A Torres
(74) *Attorney, Agent, or Firm* — Fujitsu Patent Center

(57) ABSTRACT

A transmission device is used for a network that includes a plurality of working paths and a plurality of protection paths bypassing a relevant working path for each working paths. The transmission device includes a data plane unit that transmits and receives data to and from other transmission devices; and a signaling processing unit that performs switching, when a signaling message requesting activation to switch to a first protection path corresponding to a first working path is received, from the first working path to the first protection path, wherein, when the first working path is configured as a subset of a second working path and a second protection path corresponding to the second working path is provided, the signaling processing unit performs switching from the first working path to the first protection path and performs switching from the second working path to the second protection path.

6 Claims, 15 Drawing Sheets

FIG.5

| PROTECTION PATH | HE | Node1 | Node2 | PROTECTION PATH THAT CAN BE SHORTENED | SHORTENED AMOUNT |
|---|---|---|---|---|---|
| 1 | 10A | 10A | 10D | - | 0 |
|   | 10D | 10A | 10D | - | 0 |
| 2 | 10H | 10H | 10K | - | 0 |
|   | 10K | 10H | 10K | - | 0 |
| 3 | 10J | 10J | 10K | 2 | 2 |
|   | 10K | 10J | 10K | - | 0 |

TRANSMISSION DEVICE, NETWORK DESIGNING DEVICE, ACTIVATION METHOD, AND NETWORK DESIGNING METHOD

CROSS-REFERENCE TO RELATED APPLICATION

This application is based upon and claims the benefit of priority of the prior Japanese Patent Application No. 2014-158718 filed on Aug. 4, 2014, the entire contents of which are incorporated herein by reference.

FIELD

The embodiment discussed herein is related to a transmission device, a network designing device, an activation method, and a network designing method.

BACKGROUND

Recently, a transmission device responding to an Optical Transport Network (OTN) or the like has been provided as a transmission device (hereinafter, also called "node") designed for telecommunications carriers. The telecommunication carriers are requested to build a network capable of continuously providing service by preparing a plurality of redundant paths (hereinafter, also called "routes") and using a protection path bypassing a working path in order to ensure service availability even if the working path becomes incapable of communication caused by a failure. The telecommunication carriers are also requested to build a network with fewer facilities in order to suppress service providing price.

A method of building the network responding to the request includes, for example, a shared mesh restoration method. The shared mesh restoration method is a method of sharing a bandwidth with protection paths, so that resources used to restore the failure can be reduced and high service availability can be achieved with low cost.

An operation of the shared mesh restoration will be explained with reference to, for example, FIG. 12 and FIG. 13. FIG. 12 and FIG. 13 are diagrams for explaining the shared mesh restoration as existing technology.

As illustrated in FIG. 12, a network 1a used for explaining the conventional shared mesh restoration represents a network so that 11 nodes 10 including nodes 10A to 10K are connected to each other via 12 links 50A to 50L. A first working path P10 is set on a route of the nodes 10A, 10B, 10C, and 10D in the network 1a. In addition, a route of the nodes 10A, 10E, 10F, 10G, and 10D is assumed to be set as a first protection path P11 corresponding to the first working path P10.

A second working path P20 is set on a route of the nodes 10H, 10I, 10J, and 10K. In addition, a route of the nodes 10H, 10E, 10F, 10G, and 10K is assumed to be set as a second protection path P21 corresponding to the second working path P20.

FIG. 12 represents a state before a failure occurs. For the first working path P10 and the second working path P20, a bandwidth requested by a signaling message sent from each HE node (head node) along the respective paths is ensured. For example, an HE node (head node) of the first working path P10 is set as the node 10A, and an HE node (head node) of the second working path P20 is set as the node 10H. Settings for data plane including setting of input/output interfaces and setting of cross connection between the interfaces or the like are performed by the signaling messages, and it is thereby ready to flow user traffic.

In the network 1a, the first working path P10 and the second working path P20 pass through different nodes and different links respectively, and therefore the first working path P10 and the second working path P20 are not simultaneously affected by a single link failure or a single node failure. In this case, the shared mesh restoration allows the first protection path P11 and the second protection path P21 to share a bandwidth used thereby, and it is thereby achieved to provide economical protection paths.

Signaling messages for the first protection path P11 and the second protection path P21 are transmitted along the routes of the first protection path P11 and the second protection path P21 from the HE nodes respectively. The HE node (head node) of the first protection path P11 is the same as the HE node (head node) of the first working path P10, and the HE node (head node) of the second protection path P21 is the same as the HE node (head node) of the second working path P20. Pieces of path information of the first working path P10 and the second working path P20 are included in the signaling messages for the first protection path P11 and the second protection path P21 respectively. Therefore, because the nodes 10E, 10F, and 10G can know that the first working path P10 and the second working path P20 pass through the different nodes and links respectively, it can be determined that the bandwidth of the first protection path P11 and the second protection path P21 may be shared therewith.

Because the bandwidth of the first protection path P11 and the second protection path P21 is shared, the bandwidth requested by signaling is reserved on the routes along the protection paths, but the settings for the data plane including setting of input and output interfaces and setting of cross connection between the interfaces are not performed. The reason is that the settings for the data plane is not input because whether the shared bandwidth is used by the first protection path P11 or by the second protection path P21 is not determined before occurrence of a failure.

FIG. 13 represents a case where a failure occurs in the link 50L between the nodes 10J and 10K in the network of FIG. 12. The second working path P20 is affected by the failure, and therefore the failure information is notified to the node 10H being the head node of the second working path P20. When receiving the notification, the node 10H starts activation processing for switching communication of the second working path P20 to that of the second protection path P21.

As explained above, the bandwidth for the second protection path P21 is reserved, but the setting of input/output interfaces on the route of the second protection path P21 and the setting of cross connection between the interfaces are not finished, and therefore these settings need to be performed before the switching. To perform the settings, the node 10H transmits a signaling message requesting activation of the second protection path P21. When receiving the signaling message, the nodes 10H, 10E, 10F, 10G, and 10K along the second protection path P21 perform setting of the input/output interfaces and setting of the cross connection between the interfaces so that the second protection path P21 uses the bandwidth reserved for the second protection path P21 for share. When flowing user traffic is prepared on the second protection path P21 through the procedure, the nodes 10H and 10K restore the service by performing the setting so as to flow the user traffic via the second protection path P21.

Patent Literature 1: Japanese Laid-open Patent Publication No. 2007-14032

As explained in the existing technology, in the shared mesh restoration, signaling to activate a protection path is performed after the failure occurs, a data plane unit is set by each of the nodes on the protection path, and then the activation is performed. Consequently, even if a plurality of protection paths are to be activated, the activation is independently performed for each of the protection paths. Therefore, it may take time before the switching to all the protection paths is finished after the signaling is performed.

A case where it may take time before the switching to all the protection paths is finished after the signaling is performed will be explained below with reference to FIG. 14, FIG. 15, and FIG. 16. FIG. 14 and FIG. 15 are explanatory diagrams for explaining the shared mesh restoration according to the existing technology. FIG. 16 is a ladder chart exemplifying a case of performing switching based on the existing technology.

A network 1b of FIG. 14 is configured to add a link 50M between the nodes 10F and 10J, a third working path P30, and a third protection path P31 to the network 1a of FIG. 12 which is referred to for the explanation of the existing technology. In other words, the third working path P30 having a route of the nodes 10J and 10K is set in addition to the first working path P10 and the second working path P20. Moreover, the third protection path P31 having a route of the nodes 10J, 10F, 10G, and 10K is set in addition to the first protection path P11 and the second protection path P21.

Signaling messages for the third working path P30 and the third protection path P31 are transmitted along the paths of the third working path P30 and the third protection path P31 from the HE nodes (head nodes) respectively. The HE node (head node) of the third working path P30 is the same as that of the third protection path P31, and is assumed to be, for example, the node 10J.

Pieces of path information of the first working path P10, the second working path P20, and the third working path P30 are included in the signaling messages for the first protection path P11, the second protection path P21, and the third protection path P31 respectively. The first working path P10 and the second working path P20 pass through different nodes and links based on the path information included in the signaling messages, and therefore the corresponding first protection path P11 and the second protection path P21 share the bandwidth. The second working path P20 and the third working path P30 share the nodes and the links, and therefore the second protection path P21 and the third protection path P31 do not share the bandwidth.

FIG. 15 represents a case where a failure occurs in the link 50L between the nodes 10J and 10K in the network of FIG. 14. The second working path P20 and the third working path P30 are affected by the failure, and therefore the failure information is notified to the respective HE nodes (head nodes) of the second working path P20 and the third working path P30. When receiving the notification, the node 10H starts transmission of the signaling message for activation of the second protection path P21. Likewise, the node 10J starts activation of the third protection path P31.

FIG. 16 is a ladder chart exemplifying a case of activating the second protection path P21 and the third protection path P31 using the conventional technology. Specifically, FIG. 16 is a diagram for explaining how the activation is performed when the failure illustrated in FIG. 15 occurs.

As illustrated in FIG. 16, when the second protection path P21 and the third protection path P31 are activated by using the conventional technology, the failure notification for the second working path P20 is notified to the HE node (head node) 10H of the second working path P20, and then signaling is performed in order to activate the second protection path P21 along the route of the second protection path P21 from the node 10H. Likewise, the failure notification for the third working path P30 is notified to the HE node (head node) 10J of the third working path P30, and then signaling is performed in order to activate the third protection path P31 along the route of the third protection path P31 from the node 10J. The activation of the second protection path P21 and that of the third protection path P31 are performed independently by the signaling. Therefore, the second protection path P21 is not activated based on the prediction that the failure of the link 50L occurs on the same route, and the time at which the switching to the second protection path P21 is complete becomes time t1.

In one aspect, it is to provide a transmission device and an activation method capable of shortening the time until the completion of switching when a plurality of protection paths are activated in the shared mesh restoration, and a network designing device and a network designing method for effectively using the method.

SUMMARY

According to an aspect of an embodiment, a transmission device is used for a network that includes a plurality of working paths and a plurality of protection paths bypassing a relevant working path for each working paths. The transmission device includes a data plane unit that transmits and receives data to and from other transmission devices; and a signaling processing unit that performs switching, when a signaling message requesting activation to switch to a first protection path corresponding to a first working path is received, from the first working path to the first protection path, wherein, when the first working path is configured as a subset of a second working path and a second protection path corresponding to the second working path is provided, the signaling processing unit performs switching from the first working path to the first protection path and performs switching from the second working path to the second protection path.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is an explanatory diagram of an example of time shortening;

DESCRIPTION OF EMBODIMENTS

Preferred embodiments of the present invention will be explained with reference to accompanying drawings. In the embodiments, same reference signs are assigned to components having the same functions, and overlapping explanation is omitted. It is noted that the transmission device, the network designing device, the activation method, and the network designing method explained in the following embodiments are only examples, and therefore the embodiments are not limited thereby. In addition, the embodiments may be appropriately combined with each other as far as they do not contradict each other.

Figure 1:
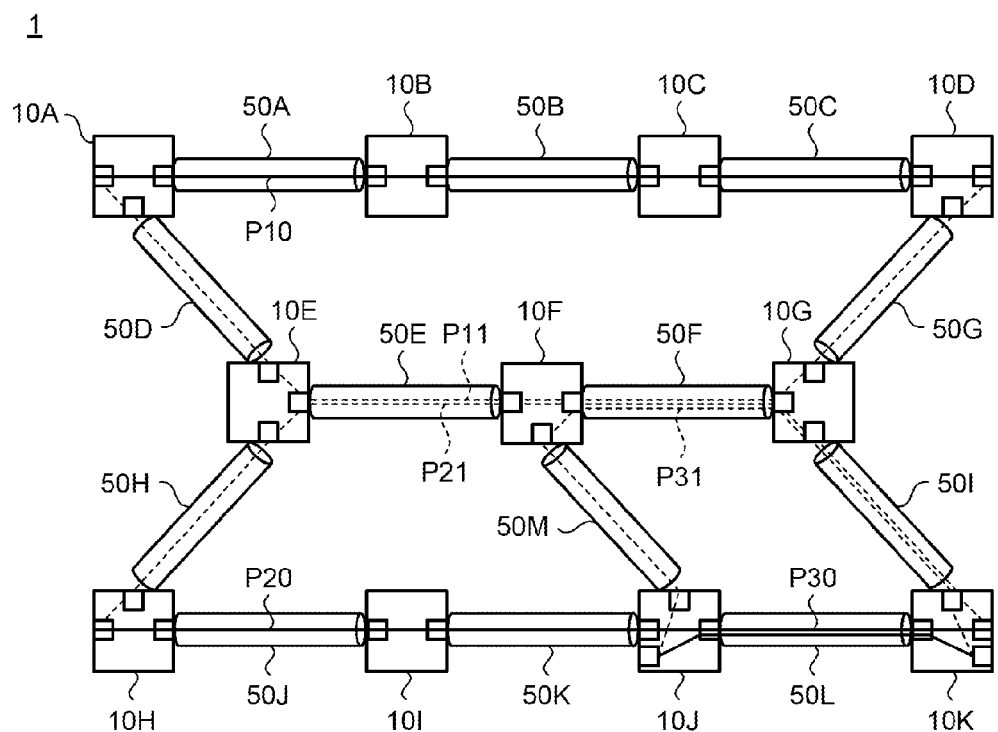
FIG. 1 is an explanatory diagram of an example of an embodiment.

FIG. 1 is an explanatory diagram of an example of an embodiment. As illustrated in FIG. 1, a network 1 is constructed using shared mesh restoration, and, for example, 11 nodes 10 including the nodes 10A to 10K are connected by 13 links including the links 50A to 50M.

The network 1 sets a path passing through the nodes 10A, 10B, 10C, and 10D, as the first working path P10. An HE node (head node) of the first working path P10 is determined by a network designing device 100 (see FIG. 2) before the first working path P10 is set. The network 1 sets a path passing through the nodes 10H, 10I, 10J, and 10K, as the second working path P20. An HE node (head node) of the second working path P20 is determined by the network designing device 100 (see FIG. 2) before the second working path P20 is set. The network 1 sets a path passing through the nodes 10J and 10K, as the third working path P30. An HE node (head node) of the third working path P30 is determined by the network designing device 100 (see FIG. 2) before the third working path P30 is set.

The network 1 sets a path passing through the nodes 10A, 10E, 10F, 10G, and 10D, as the first protection path P11 bypassing the first working path P10. An HE node (head node) of the first protection path P11 is the same as the HE node (head node) of the first working path. The network 1 sets a path passing through the nodes 10H, 10E, 10F, 10G, and 10K, as the second protection path P21 bypassing the second working path P20. An HE node (head node) of the second protection path P21 is the same as the HE node (head node) of the second working path. The network 1 sets a path passing through the nodes 10J, 10F, 10G, and 10K, as the third protection path P31 bypassing the third working path P30. An HE node (head node) of the third protection path P31 is the same as the HE node (head node) of the third working path. Herein, the route of the third working path P30 passes through the node 10J, the link 50L, and the node 10K, and the route of the second working path P20 includes the node 10H, the link 50J, the node 10I, the link 50K, the node 10J, the link 50L, and the node 10K. Therefore, the route of the third working path P30 is formed as a subset of the route of the second working path P20.

The respective paths perform, for example, bidirectional data transmission. In each of the first working path P10, the first protection path P11, the second working path P20, the second protection path P21, the third working path P30, and the third protection path P31, communication is controlled by a signaling message. The nodes 10 mutually transmit signaling messages including information for ensuring the bandwidth for the respective paths. Settings of paths for the first working path P10, the first protection path P11, the second working path P20, the second protection path P21, the third working path P30, and the third protection path P31 are performed by using the signaling messages.

For example, when signaling is performed on the working path (P10, P20, P30), a bandwidth is allocated/reserved, and the setting is written to a path database of the nodes 10 and is immediately set (reflected) in the data plane unit. The setting of the data plane unit includes setting of a line interface unit being the input/output interface and setting of a cross connect unit that connects line interface units.

Therefore, the bandwidth allocated in the link (50A to 50M) between the nodes 10 is occupied by one working path. The working path can pass the user traffic immediately in response to receiving signaling.

In the protection path (P11, P21, P31), allocation/reservation of the bandwidth is performed in a stage when signaling is first performed and the setting is written to the path database of the nodes 10, but the setting is not set (reflected) in the data plane unit. Therefore, the user traffic is not passed through the protection path in the stage when the signaling is first performed, but the bandwidth allocated to the protection path can be shared with other protection paths. For example, the first protection path P11 and the second protection path P21 can share the bandwidth allocated to the path passing through the nodes 10E, 10F, and 10G. Moreover, the first protection path P11 and the third protection path P31 can share the bandwidth allocated to the path passing through the nodes 10F and 10G.

In a protection path, when a failure occurs in the working path and the user traffic is passed to the protection path, a head end node (HE node) being a start point of signaling transmits a signaling message for activating the protection path to an adjacent node on a downstream side. The HE node performs interface setting and cross connection setting for the protection path based on the information of the path database on the data plane unit. The HE node is determined by the network designing device 100.

When receiving the signaling message for activation, similarly to the HE node, each of the nodes 10 along the protection path transmits the signaling message to an adjacent node on the downstream side of the protection path and performs setting to the data plane unit. When the signaling message for activation reaches an end node of the protection path, then this enables the user traffic to pass through the protection path. In the stage when the user traffic can be passed in the protection path, the bandwidth allocated to the protection path is occupied by the activated protection path.

The network designing device 100 is an information processing device implemented by a program on a computer, and determines information such as a route, a bandwidth, and an HE node of the path in the network 1 based on a user request made through an input operation using an input device. For example, when a new traffic request occurs, network design is performed by the network designing device 100 through an input operation made by the user. As a specific example, when a new path whose HE node or the like is not determined is to be set in addition to an existing path (working path, protection path) whose HE node or the like is determined, the network design is performed in the network designing device 100.

Figure 2:
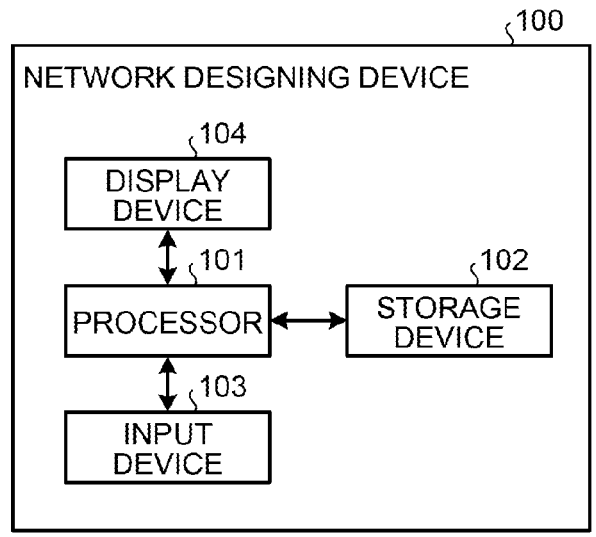
FIG. 2 is a block diagram of a hardware configuration of a network designing device.

FIG. 2 is a block diagram of a hardware configuration of the network designing device 100. As illustrated in FIG. 2, the network designing device 100 includes a processor 101, a storage device 102, an input device 103, and a display device 104 which are connected to each other via bus so that various signals and data can be input and output. The processor 101 is, for example, a central processing unit (CPU) or a digital signal processor (DSP). The storage device 102 includes a RAM such as a synchronous dynamic random access memory (SDRAM) in addition to a nonvolatile storage device such as a hard disk drive (HDD), a read only memory (ROM), and a flash memory. The input device 103 includes, for example, a keyboard, a mouse, and a touch panel, and the display device 104 includes, for example, a liquid crystal display (LCD) or an electro luminescence display (ELD). The network designing device 100 implements a function related to network design by, for example, a program stored in the storage device 102 executed by the processor 101.

Figure 3:
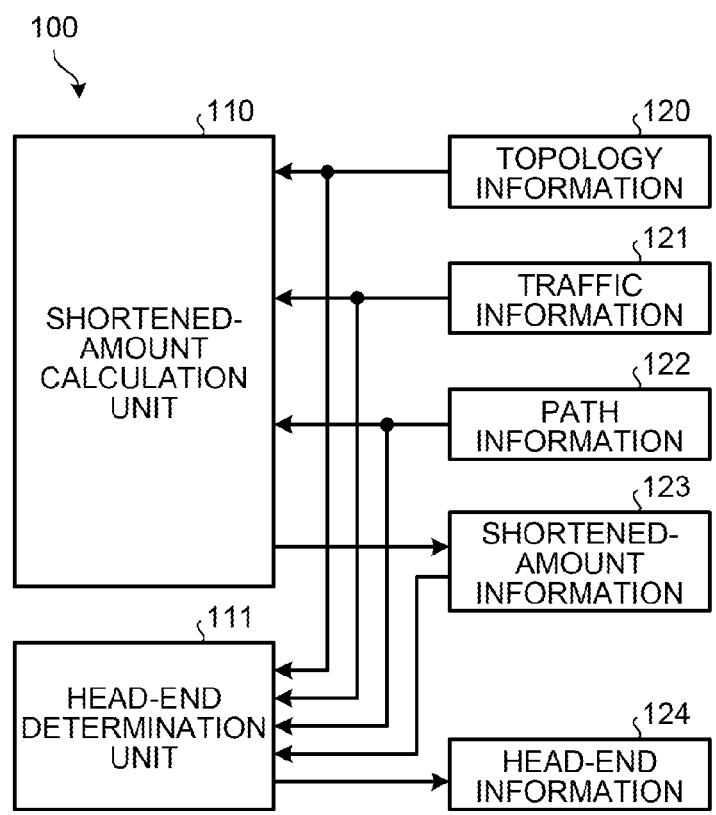
FIG. 3 is a block diagram of a functional configuration of the network designing device.

FIG. 3 is a block diagram of a functional configuration of the network designing device 100. As illustrated in FIG. 3, the network designing device 100 includes function units being a shortened-amount calculation unit 110 and a head-end determination unit 111. The shortened-amount calculation unit 110 calculates, for example, when one node 10 of end nodes of a path is determined as an HE node based on information input through an input operation made by the user or the like at the time of network designing, the shortening effect of the switching time (shortened amount) to a protection path of other traffic different from the path.

Information to be input to the shortened-amount calculation unit 110 includes topology information 120, a traffic information 121, and a path information 122. The shortened-amount calculation unit 110 outputs a calculated shortened amount as shortened-amount information 123.

The topology information 120 is information related to connection of a link (links 50A to 50M) between a plurality of nodes 10 configuring the network 1. The topology information 120 includes information of one of nodes 10 connected by a link, the other node 10 connected by the link, a length of the link, and the like for each link.

The traffic information 121 is information related to existing paths (working path, protection path) and indicates an existing traffic in the network 1 such as a route and a bandwidth of a path, and an HE node.

The path information 122 is information related to one or more new pairs of working and protection paths. The path information 122 includes information of a route and a bandwidth of each of the paths but does not include information of their HE nodes because the HE nodes are undetermined.

The head-end determination unit 111 determines an HE node of each of the newly set paths based on the shortened-amount information 123 output by the shortened-amount calculation unit 110, and outputs head end information 124 indicating the determined HE nodes. The head end information 124 is transmitted to the nodes 10 on the network 1, so that the HE nodes of the newly set paths (working path, protection path) are set on the network 1.

Figure 4:
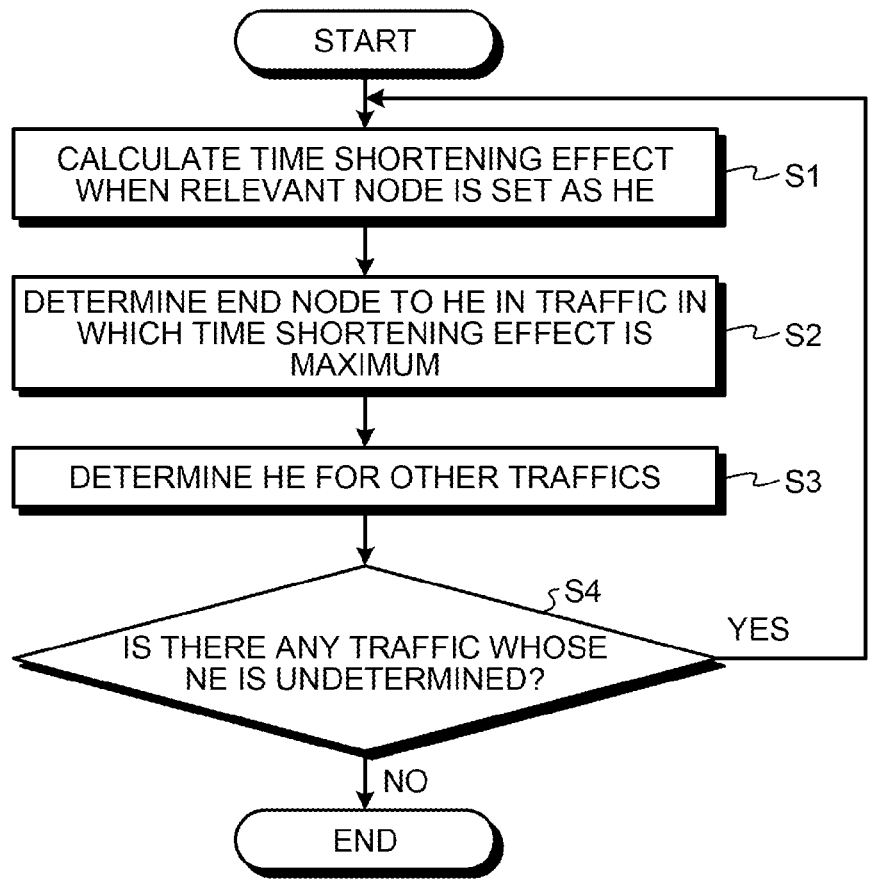
FIG. 4 is a flowchart of an example of processing for determining an HE node.

FIG. 4 is a flowchart of an example of processing for determining an HE node. As illustrated in FIG. 4, the shortened-amount calculation unit 110 calculates the shortening effect of the switching time for each node 10 of end nodes of every newly set paths (working path and protection path), when the node 10 is set as the HE node, based on the input topology information 120, traffic information 121, and path information 122 (S1).

The HE node becomes a start point of a signaling message requesting activation, of the two end nodes 10 of the traffic, in the activation processing for switching from the working path to the protection path. Therefore, when the two protection paths have an overlap, by appropriately setting the HE node when switching to the two protection paths is performed, the switching time can be shortened.

Specifically, the shortened-amount calculation unit 110 calculates the shortened-amount of switching for each end node (call first end) of every newly set protection paths (call path 'A'), and each determined HE node of newly set protection paths or existing paths in traffic information. The shortened-amount is the summation of the shortened-amount against every other protection paths (call path 'B'). The other paths include paths in traffic information of which HE nodes are determined and paths in path information of which HE nodes are determined during the process shown in FIG. 4.

When the HE node of the path 'A' is not determined and the HE node of the path 'B' is determined, shortened-amount of the first end against the path 'B' is calculated as follows:

If the working path corresponding to the path 'A' is totally included by the working path corresponding to the path 'B', and the other end of the first end among the end node pair of the path 'A' is the same as the end node of the path 'B' that is not a HE node of the path 'B' (call common end node), and the path 'A' and the path 'B' have the common section, and the common section includes the common end node and does not include the first end or the HE node of the path 'B', the shortened-amount is determined as the number of hops of the common section. Otherwise, the shortened-amount is determined as 0.

When either the HE node of the path 'A' or the HE node of the path 'B' is not determined, shortened-amount of the first end against the path 'B' is calculated as follows:

If the working path corresponding to the path 'A' is totally included by the working path corresponding to the path 'B', and the other end of the first end among the end node pair of the path 'A' is the same as either end node of the path 'B' (call common end node), and the path 'A' and the path 'B' have the common section, and the common section includes the common end node and does not include the first end or the other end of the common node among the end node pair of the path 'B', the shortened-amount is determined as the number of hops of the common section.

Otherwise, the shortened-amount is determined as 0.

When the HE node of the path 'A' is determined and the HE node of the path 'B' is not determined, shortened-amount of the first end against the path 'B' is calculated as follows:

If the first end is the HE node of the path 'A', and the working path corresponding to the path 'A' is totally included by the working path corresponding to the path 'B', and the other end of the first end among the end node pair of the path 'A' is the same as either end node of the path 'B' (call common end node), and the path 'A' and the path 'B' have the common section, and the common section includes the common end node and does not include the first end or the other end of the common node among the end node pair of the path 'B', the shortened-amount is determined as the number of hops of the common section.

Otherwise, the shortened-amount is determined as 0.

When both the HE node of the path 'A' and the HE node of the path 'B' is determined, shortened-amount of the first end against the path 'B' is determined as 0.

The shortened amount calculated at S1 is output as the shortened-amount information 123.

Subsequently, the head-end determination unit 111 determines an end node with the largest value of the shortened-amount calculate in S1 among all end nodes of all paths of which HE nodes are not determined as the HE node of the path (S2). Of other newly set paths of which HE nodes are not determined and the switching time is shortened by determination of the HE node at S2, the HE node is determined to a node 10 at an end of which the shortening effect is acquired (S3). That is, the HE node is determined as the other end node of the common end node with the path of which the HE node is determined in S2. Subsequently, the head-end determination unit 111 determines whether there is any traffic whose HE node is undetermined (S4), and returns the processing to S1 when there is one.

FIG. 5 is an explanatory diagram of an example of time shortening. At S1, a shortened amount of each node at respective ends of each protection path is calculated when the node is determined as the HE node. Therefore, as illustrated in FIG. 5, for the first path (P10, P11), the second path (P20, P21), and the third path (P30, P31), when the HE node is determined to 10J in the third path P31, the third path P31 may reduce the switching time of the second path P21 (in the case that the HE node of the second path P21 is determined as node 10H), and the shortened amount is "2", and HE node 10J of P31 does not reduce the switching time of first path. Consequently, the value of shortened-amount of 10J of P31 is determined as "2". For the other end node 10K of P31, and the those of the other path P11 and P21, the shortened amount is determined as "0". Thus, at S2, the HE node of the third path (P30, P31) is determined to 10J.

Subsequently, the switching time of the second path (P20, P21) can be shortened by the determination at S2 and it can also be shortened when the HE node of the second path (P20, P21) is 10H. Thus, at S3, the HE node of the second path (P20, P21) is determined to 10H. The HE node of the first path (P10, P11) is not yet determined, and therefore the processing is returned from S4 to S1, and a shortened amount is recalculated as a path whose HE node is undetermined. In the recalculation, the shortened amount of the first path (P10, P11) is "0" at any node. Thus, at S2, the HE node of the first path (P10, P11) is determined to an arbitrary one of them and the processing is ended.

The case where the HE node of the third path (P30, P31) is set (established) as the node 10J will be explained below. When the HE node of the third path (P30, P31) is established as the node 10J, the shortened amount is "2", which is the maximum. At S2, specific processing is not performed because the HE of the third path is determined. The switching time of the second path (P20, P21) can be shortened by the third path with the maximum shortened-amount in S2 and it can be shortened when the HE node of the second path (P20, P21) is 10H. Thus, at S3, the HE node of the second path (P20, P21) is determined to 10H. Thereafter, the processing is also returned to S1, the HE node of the first path (P10, P11) is determined to an arbitrary one of them, and the processing is ended.

Figure 6:
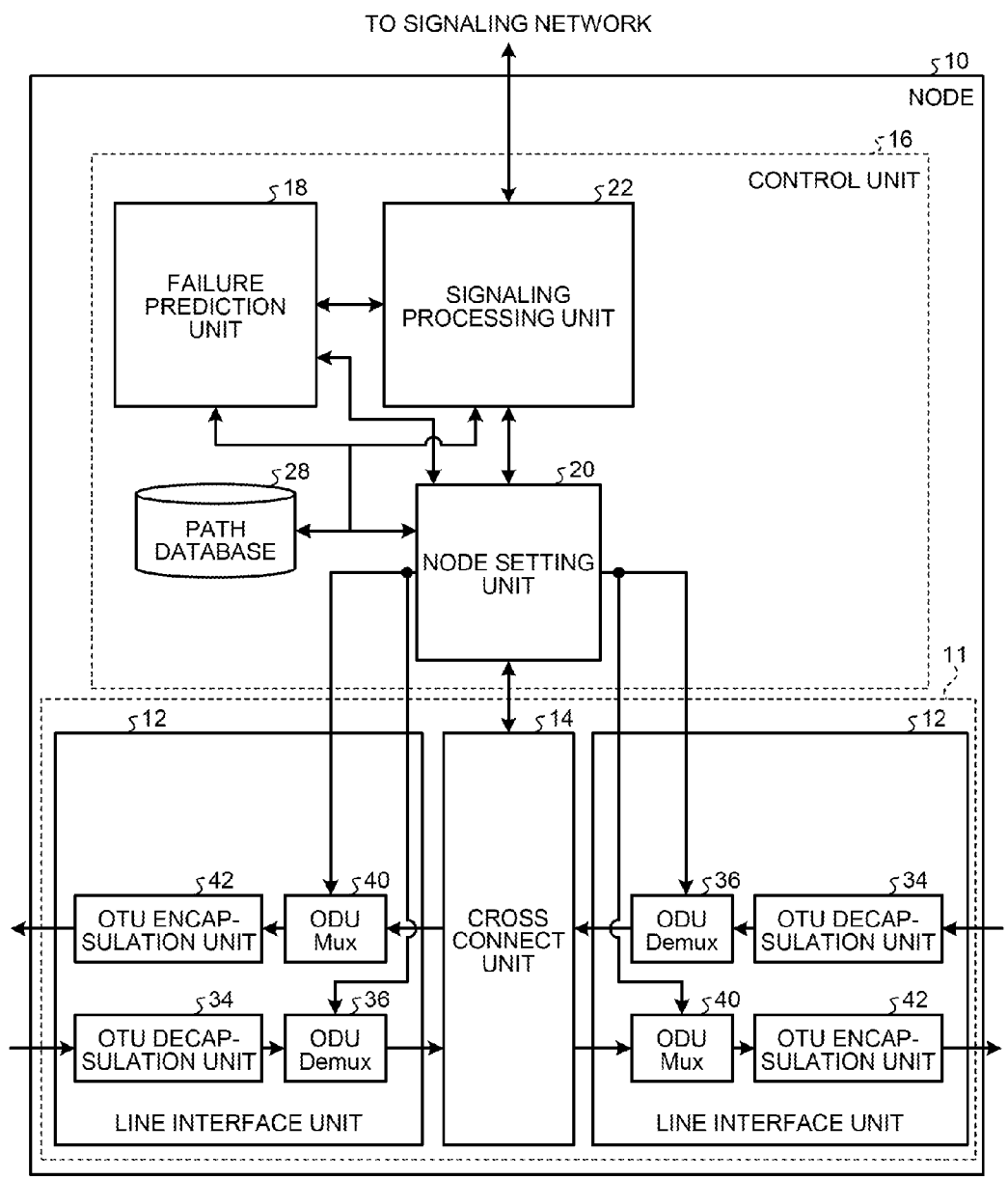
FIG. 6 is a block diagram of an example of a node configuration according to the embodiment.

Details of the node 10 will be explained next. FIG. 6 is a block diagram of a configuration example of the node 10 according to the embodiment. As illustrated in FIG. 6, the node 10 includes a data plane unit 11 and a control unit 16.

The data plane unit 11 includes two line interface units 12 and a cross connect unit 14. The line interface unit 12 is connected to other nodes 10 (transmission devices) through links formed with an optical fiber, and transmits user traffic. In the node 10 illustrated in the figure, the case where the line interface unit 12 is provided by two is explained for the sake of explanation. However, the number of line interface unit 12 can be changed appropriately according to, for example, the number of paths that branch or join. For example, the data plane unit 11 may include three or more line interface units 12.

The line interface unit 12 includes an optical transport unit (OTU) decapsulation unit 34, an optical data unit (ODU) demultiplexer (Demux) 36, an ODU multiplexer (Mux) 40, and an OTU encapsulation unit 42. The line interface unit 12 is set following the setting of a line interface. The setting of the line interface represents setting of path information of paths, bandwidth information, and information of an allocated time slot, and the like of the line interface unit 12.

The OTU decapsulation unit 34 decapsulates an OTU frame received from other node through a link and extracts an ODU frame. The OTU decapsulation unit 34 outputs error correction data based on an error correction result of the OTU frame. The ODU demultiplexer 36 extracts a client-layer ODU frame from a server-layer ODU frame extracted by the OTU decapsulation unit 34.

The ODU multiplexer 40 multiplexes an optical channel data unit (ODU) frame output from the cross connect unit 14 in the server-layer ODU frame. The OTU encapsulation unit 42 encapsulates the ODU frame generated by the ODU multiplexer 40 to generate an OTU frame, and outputs the OTU frame to the link.

The cross connect unit 14 outputs the ODU frame extracted by each of the line interface units 12 to a line interface unit 12 in which a path to a target node is set following the cross connection setting. The cross connection setting defines to which line interface unit 12 the ODU frame is to be output.

The control unit 16 includes a failure prediction unit 18, a node setting unit 20, and a signaling processing unit 22. A specific hardware configuration of the control unit 16 includes a CPU, a memory such as a random access memory (RAM) and a read-only memory (ROM), and a nonvolatile storage device such as a solid state drive (SSD) and a hard disk drive (HDD).

The failure prediction unit 18 predicts whether a failure occurring in a working path affects other working path in activation processing for switching from a working path to a protection path. Specifically, the failure prediction unit 18 determines whether a set of nodes and links through which the working path with the failure passes is a subset of a set of nodes and links through which other working paths pass, based on the path information of a path database 28. When it is a subset, the failure prediction unit 18 predicts that the other working paths are also affected by the same failure. When it is not a subset, the failure prediction unit 18 predicts that the other working paths are not affected by the same failure. The prediction result is output to the signal processing unit 20.

The node setting unit 20 refers to the path database 28 according to an instruction of the signaling processing unit 22 to perform setting of the data plane unit 11. The setting of the data plane unit 11 is line interface setting and cross connection setting for the line interface unit 12 and the cross connect unit 14 respectively, in other words, the path information of paths, the bandwidth information, and the information of allocated time slot, and the like.

The node setting unit 20 performs, when activation processing of a protection path is requested from the signaling processing unit 22, the activation processing of a protection path on the data plane unit 11. When the activation processing of the protection path is complete, the data plane unit 11 switches from the working path to the protection path. However, even when the node setting unit 20 performs the setting of the data plane unit 11, a situation where the user traffic can be flowed does not become ready until the activation processing of the protection path is complete.

The path database 28 stores the line interface setting and the cross connection setting for the working paths and the protection paths, in other words, the path information of the paths, the bandwidth information, the information of allocated time slot, and the like.

The signaling processing unit 22 uses a signaling network being a line different from the link to exchange signaling messages with other nodes. As the signaling message, Resource ReSerVation Protocol-Traffic Engineering (RSVP-TE) can be used.

The signaling processing unit 22 requests activation processing for switching from a working path to a protection path from the node setting unit 20 when request information of the activation processing for activating the protection path is included in the received signaling message.

Figure 7:
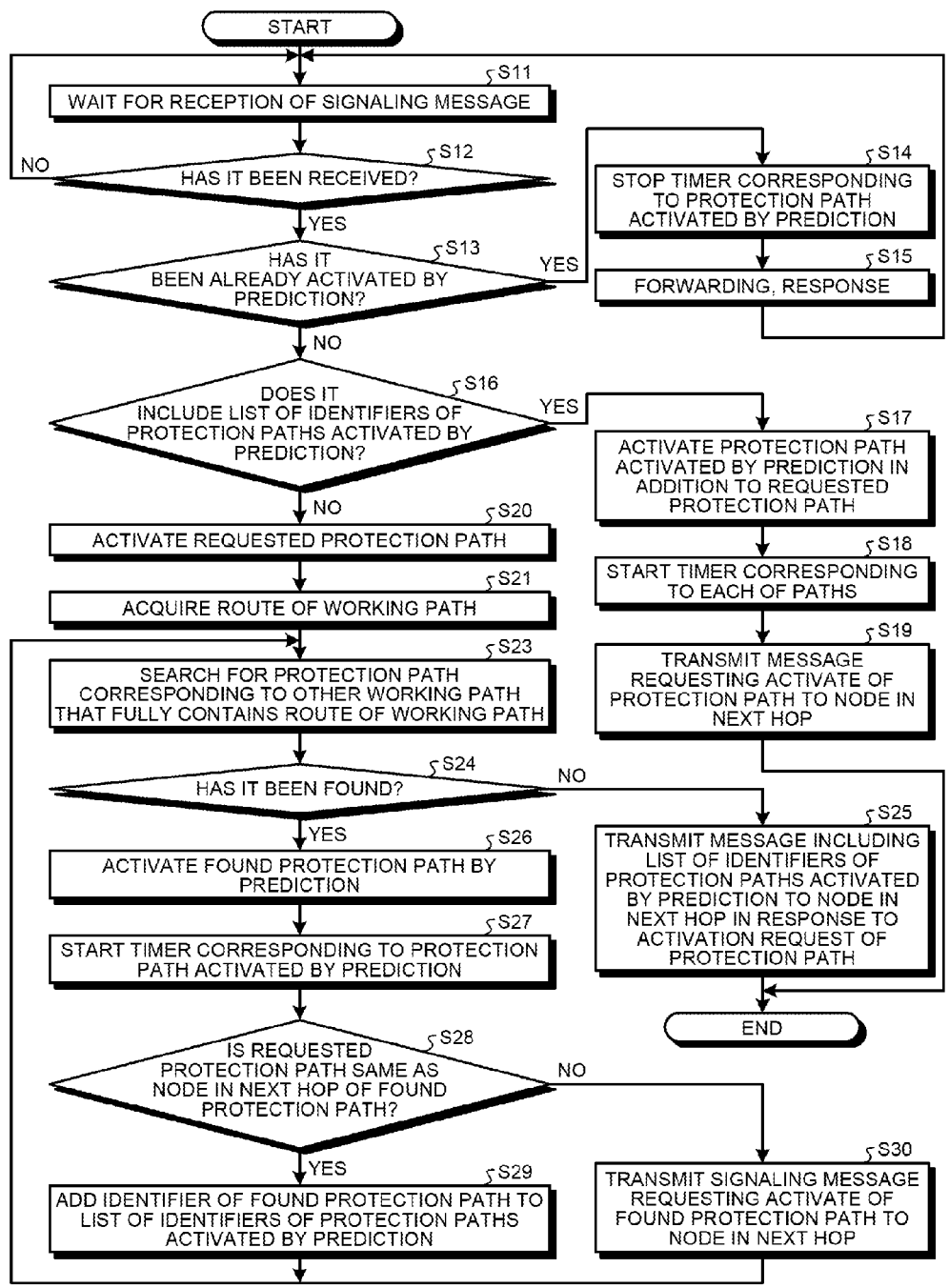
FIG. 7 is a flowchart of an example of processing for the node according to the embodiment.

Details of the activation processing will be explained herein. FIG. 7 is a flowchart of an example of the processing for the node 10 according to the embodiment. For example, in the case of the third working path P30, the flowchart represents the processing performed by the nodes 10F, 10G, and 10K related to the switching to the third protection path P31.

The signaling processing unit 22 in each of the nodes 10F, 10G, and 10K related to the switching to the third protection path P31 waits for reception of the signaling message requesting Activate to switch to the protection path (S11) and determines whether it has been received (S12). When the signaling message for switching to the protection path has not been received (No at S12), the signaling processing unit 22 returns the processing to S11 and waits for the reception. When the signaling message for switching to the protection path has been received (Yes at S12), the signaling processing unit 22 requests the activation processing from the node setting unit 20.

When the activation processing is requested, the node setting unit 20 determines whether the protection path (hereinafter, "protection path A") requested by the signaling message has already been activated by prediction and the switching to the protection path A has been performed, by referring to the path information of the path database 28 (S13).

When the protection path A of which Activate is requested by the signaling message has been switched by prediction (Yes at S13), the node setting unit 20 stops a timer for the protection path A (S14). The timer is started when the switching to the protection path is performed in the processing at S18 and S27 (details thereof will be explained later).

Subsequently, the node setting unit 20 forwards the signaling message requesting Activate of the protection path A to a node 10 in a next hop of the protection path A based on the path information of the path database 28, and immediately sends back a response message to the signaling message (S15).

When the protection path A of which Activate is requested by the signaling message has not been switched by prediction (No at S13), the node setting unit 20 determines whether the received signaling message includes a list of identifies of protection paths activated by the prediction of the previous node 10 (S16).

Figure 8:
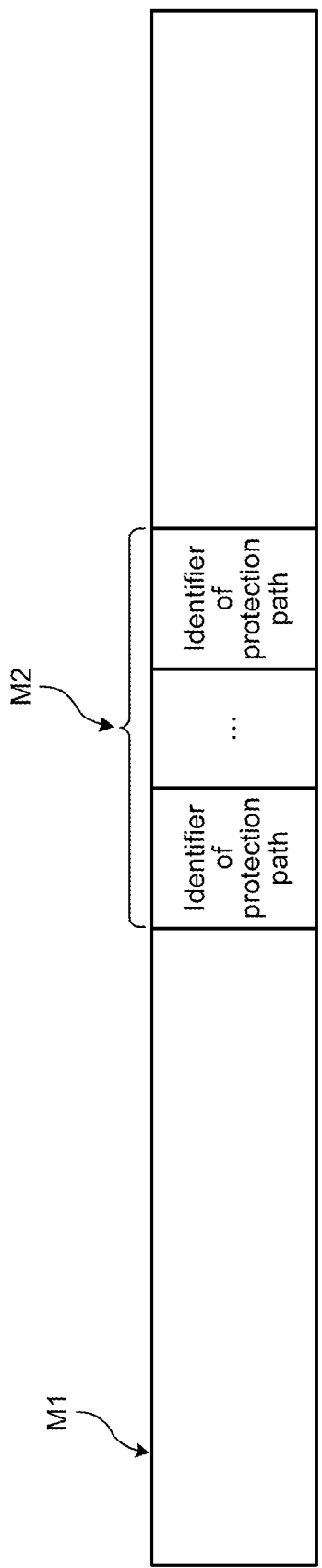
FIG. 8 is an explanatory diagram of an example of a signaling message.

FIG. 8 is an explanatory diagram of an example of a signaling message M1. As illustrated in FIG. 8, when the protection paths activated by the prediction of the previous node 10 are included in the signaling message M1, a list M2 of identifiers for identifying the protection paths is included in the signaling message M1. The node setting unit 20 can determine the protection path activated by the prediction using the identifier included in the list M2.

When the list M2 of the identifiers of the activated protection paths is included in the signaling message M1 (Yes at S16), the node setting unit 20 activates the protection path activated by the prediction of the node 10 in addition to the protection path A requested by the received signaling message (S17). Subsequently, the node setting unit 20 starts counting the timer corresponding to each of the protection paths (S18). The node setting unit 20 then transmits the signaling message requesting Activate of the protection path A to the node 10 in the next hop of the protection path A based on the path information of the path database 28 (S19).

When the list M2 of the identifiers of the activated protection paths is not included in the signaling message M1 (No at S16), the node setting unit 20 activates the protection path A requested by the received signaling message (S20). The node setting unit 20 then acquires a route (information) of a working path (hereinafter, "working path A") corresponding to the protection path A by referring to the path database 28 (S21).

Subsequently, the node setting unit 20 searches for a protection path corresponding to other working path having a route that fully contains the route of the working path A from all the routes in the path database 28 based on the path information acquired at S21 (S23). When a protection path that meets the conditions has not been found at S23 (No at S24), the node setting unit 20 transmits the signaling message M1 including the list of the identifiers of the protection paths activated by the prediction to the node 10 in the next hop in response to the activation request of the protection path A (S25).

When the protection path that meets the conditions has been found at S23 (Yes at S24), because the found protection path is a protection path for the working path including the route of the working path A, it is predicted that switching to the protection path is performed by the failure of the working path A. Therefore, the node setting unit 20 activates the found protection path by the prediction (S26), and starts counting the timer for the protection path activated by the prediction (S27).

Subsequently, the node setting unit 20 determines whether the protection path A of which Activate is requested and the node 10 in the next hop of the found protection path are the same as each other based on the path information of the path database 28 (S28). When both of them are the same as each other (Yes at S28), the node setting unit 20 adds the identifier of the found protection path to the list M2 of the identifiers of the protection paths activated by the prediction (S29).

When the protection path A of which Activate is requested and the node 10 in the next hop of the found protection path are different from each other (No at S28), the node setting unit 20 transmits the signaling message requesting Activate of the found protection path to the node 10 in the next hop based on the path information of the path database 28 (S30).

The node setting unit 20 returns the processing to S23 after S29 and S30 to search for another protection path.

Figure 9:
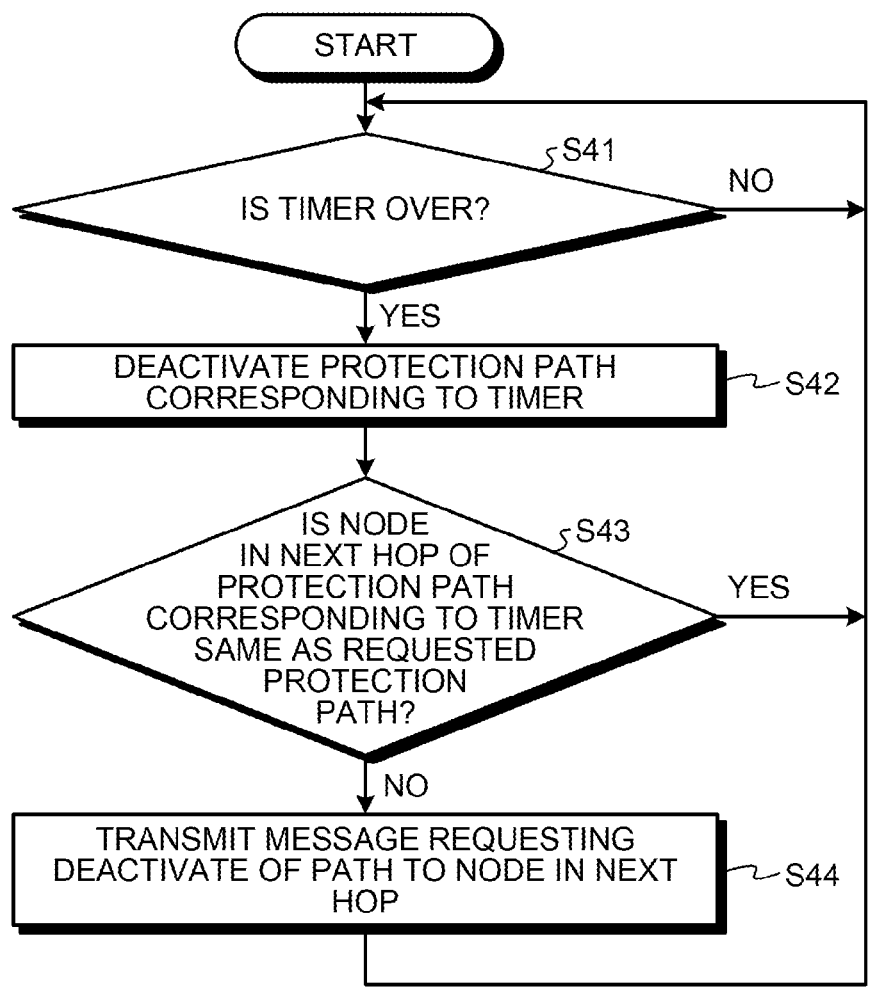
FIG. 9 is a flowchart of an example of timer processing.

Details of timer processing related to the timer started at S18 and S27 will be explained below. FIG. 9 is a flowchart of an example of the timer processing.

As illustrated in FIG. 9, the node setting unit 20 determines whether the started timer is over after a passage of preset time (S41). When Activate of the protection path activated by the prediction is not requested within a predetermined time at S18 and S27, it is determined that switching by the prediction is not necessary, and the protection path is returned to the working path. At S41, it is determined whether an actual time for waiting for a request of Activate (for example, time corresponding to the predetermined number of hops) has passed after the switching to the protection path by the prediction.

When the timer is not over (No at S41), the node setting unit 20 stands by for processing, and waits for the request of Activate of the protection path activated by the prediction. When the timer is over (Yes at S41), the node setting unit 20 determines that the switching by the prediction is not necessary and deactivates the protection path corresponding to the timer (S42).

Subsequently, the node setting unit 20 determines whether the protection path corresponding to the timer and the node 10 in the next hop of the requested protection path A are the same as each other based on the path information of the path database 28 (S43). When both of them are not the same as each other (No at S43), the node setting unit 20 transmits the signaling message requesting Deactivate of the protection path corresponding to the timer (S44), and returns the processing to S41. When both of them are the same as each other (Yes at S43), the node setting unit 20 returns the processing to S41 without performing the processing of S44.

Figure 10:
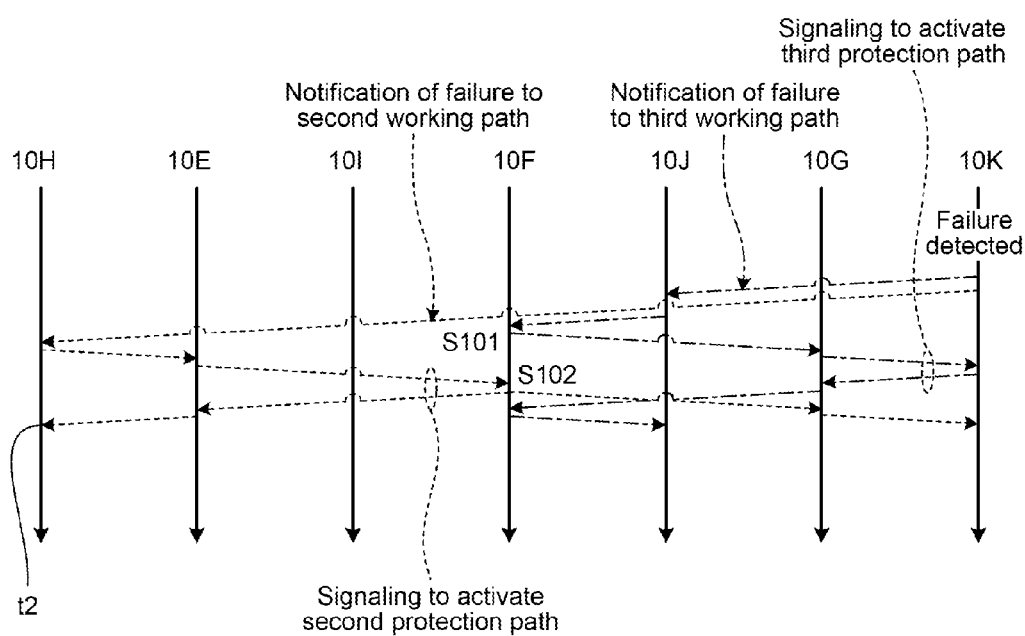
FIG. 10 is a ladder chart exemplifying a case of performing switching based on failure prediction.

FIG. 10 is a ladder chart exemplifying a case of performing switching based on failure prediction. Specifically, FIG. 10 is a diagram for explaining activation performed by the node 10 according to the present embodiment when a failure occurs in the link 50L between the nodes 10J and 10K in the network 1 of FIG. 1. The node 10 according to the present embodiment activates the protection path by prediction (failure prediction).

As illustrated in FIG. 10, when detecting a failure occurring in the link 50L between the nodes 10J and 10K, the node 10K notifies the nodes 10H and 10J of occurrence of the failure. The node 10H having received the notification of the occurrence of the failure sends the signaling to activate the second protection path P21 along the route of the second protection path P21. The node 10J having received the notification of the occurrence of the failure sends the signaling to activate the third protection path P31 along the route of the third protection path P31 (S101).

At this time, the node 10F knows, based on the path information, that the set of the nodes and the link through which the third working path P30 passes is the subset of the set of the nodes and the links through which the second working path P20 passes. Accordingly, when the failure occurs in the third working path P30, the node 10F determines it as Yes at S24, and can predict that the second working path P20 is also affected by the same failure. Therefore, when receiving the signaling message to activate the third protection path P31, the node 10F activates not only the third protection path P31 but also the second protection path P21 at the same time through the processing at S26 (S102).

The node 10F then sets the timer corresponding to the second protection path P21 activated by the prediction through the processing at S27. The node 10F determines that the prediction is failed, through the timer processing exemplified in FIG. 9, if the signaling message to activate the second protection path P21 is not actually received until the set timer is over. Therefore, the node 10F determines it as Yes at S41, and deactivates the second protection path P21.

Moreover, the node 10F includes the list of the identifiers for the second protection paths P21 activated by the prediction in the signaling message requesting Activate of the third protection path P31 (S29). The node 10F sends the signaling message requesting Activate of the third protection path P31 including the list of the identifiers for the second protection path P21 to the node 10G in the next hop of the third protection path P31 (S25).

Because the identifiers for the second protection path P21 are included in the signaling message requesting Activate of the third protection path P31, the node 10G determines it as Yes. Therefore, the node 10G activates the second protection path P21 in addition to the third protection path P31 through the processing at S17. The node 10G then starts the timer corresponding to the second protection path P21 similar to the node 10F through the processing at S18. The node 10K performs the same processing as that of the node 10G.

When receiving the signaling message to activate the second protection path P21 from the node 10H (S12), the node 10F determines it as Yes at S13 because it is already activated by the prediction. Therefore, the node 10F stops the timer because it is predicted correctly (S14). The node 10F forwards the signaling message from the node 10H to the node 10G in the next hop of the second protection path P21, and immediately sends back a response message to the node 10H. The response message reaches the node 10H, and the switching to the second protection path P21 is thereby complete at time t2.

Figure 16:
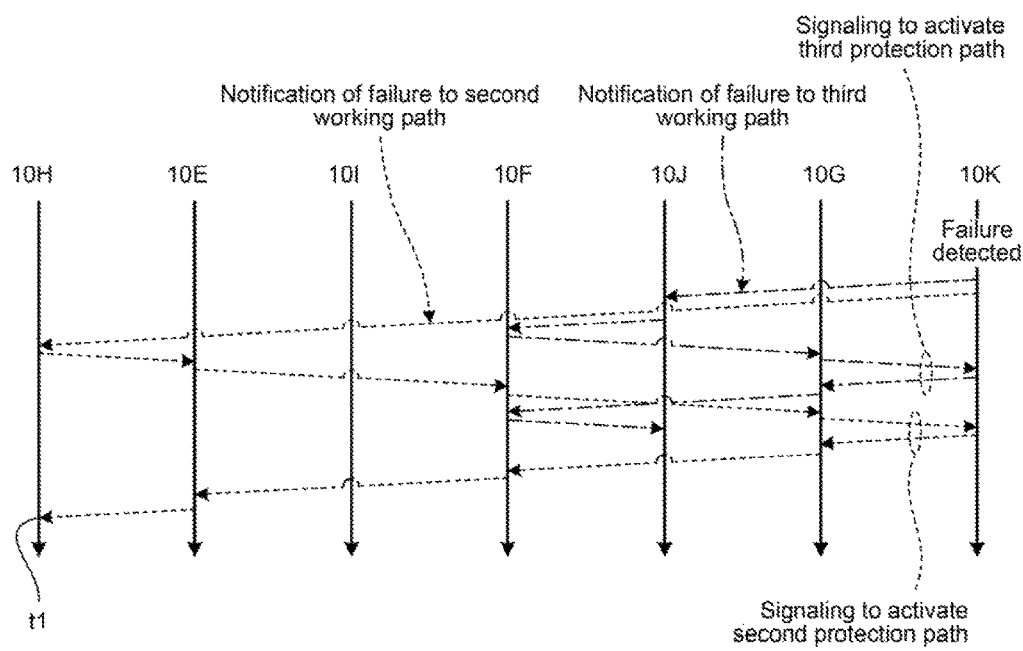
FIG. 16 is a ladder chart exemplifying a case of performing switching based on the existing technology.

As is apparent from a comparison between the time t1 of FIG. 16 and the time t2 of FIG. 10, by performing switching to the protection path by prediction of a failure, the time for completion of the switching can be shortened.

In the embodiment, in nodes 10 shared by a plurality of protection paths, the number of the protection paths is three at most; however, the number is not limited thereto, and the nodes may be shared by a greater number of protection paths. Moreover, the network configuration is not limited to the embodiment, and any network configuration is applicable if a bypassed path can be ensured. If it is a network in which a path is shared by a plurality of working paths, the network is applicable not only to the shared mesh restoration but also to any network.

The components in the illustrated units are not necessarily configured as physically illustrated ones. In other words, specific modes of how the units are distributed or integrated are not limited to the illustrated ones, and the whole of or part of the units can be configured by functionally or physically distributing or integrating them in arbitrary units according to various loads, usages, and so on.

The whole of or any part of the various processing functions performed by the devices may be performed on a central processing unit (CPU) (or a microcomputer such as a micro processing unit (MPU) and a micro controller unit (MCU)). It goes without saying that the whole of or any part of the various processing functions may be performed on the program analyzed and executed by the CPU (or a microcomputer such as MPU and MCU) or on hardware by wired logic.

As explained above, the transmission devices (10), which is used for the network that includes the working paths and protection paths bypassing a working path for each working paths, includes the data plane unit (11) and the signaling processing unit (22). The data plane unit (11) transmits and receives data to and from other transmission devices. When receiving a signaling message requesting activation to switch to the first protection path corresponding to the first working path through the signaling network, the signaling processing unit (22) switches the path from the first working path to the first protection path. When the first working path is configured as a subset of the second working path and the second protection path corresponding to the second working path is provided, the signaling processing unit (22) performs switching to the first protection path and performs switching to the second protection path by predicting that the failure occurs also in the second working path. Thus, in the shared mesh restoration, the time for completion of switching when protection paths are activated can be shortened. The network designing device (100) selects an HE node (head node) for the first working path and the second working path before the first working path, the second working path, the first protection path, and the second protection path are set so that high-speed switching using the failure prediction is effectively functioned.

Figure 11:
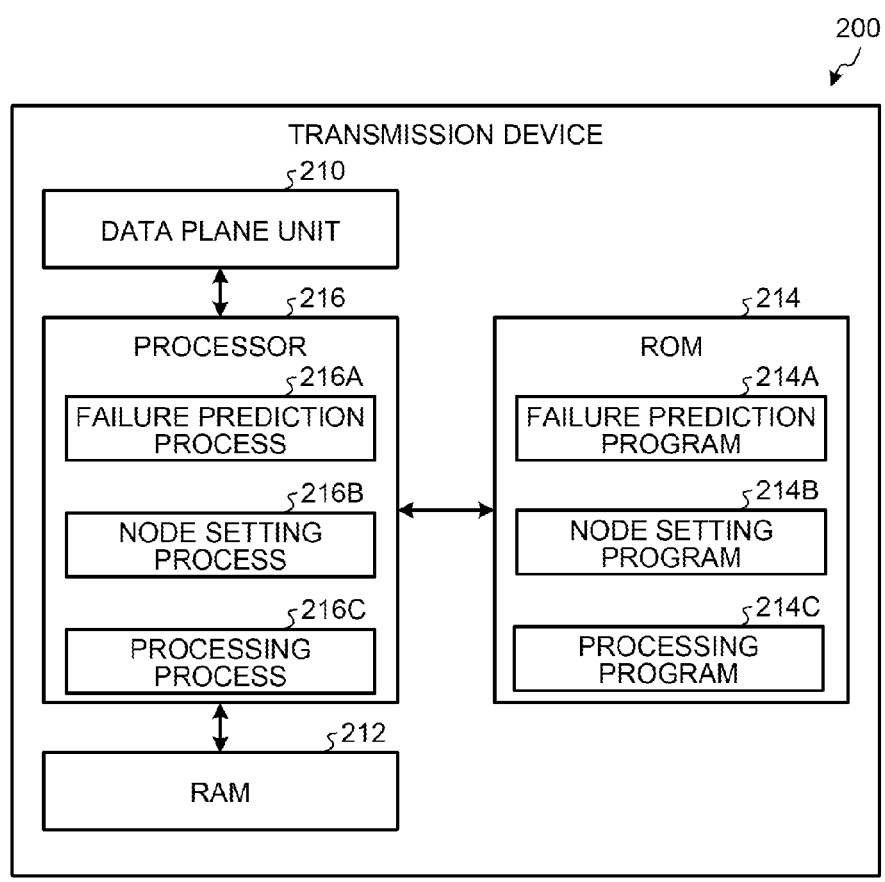
FIG. 11 is an explanatory diagram of an example of a transmission device.
Figure 12:
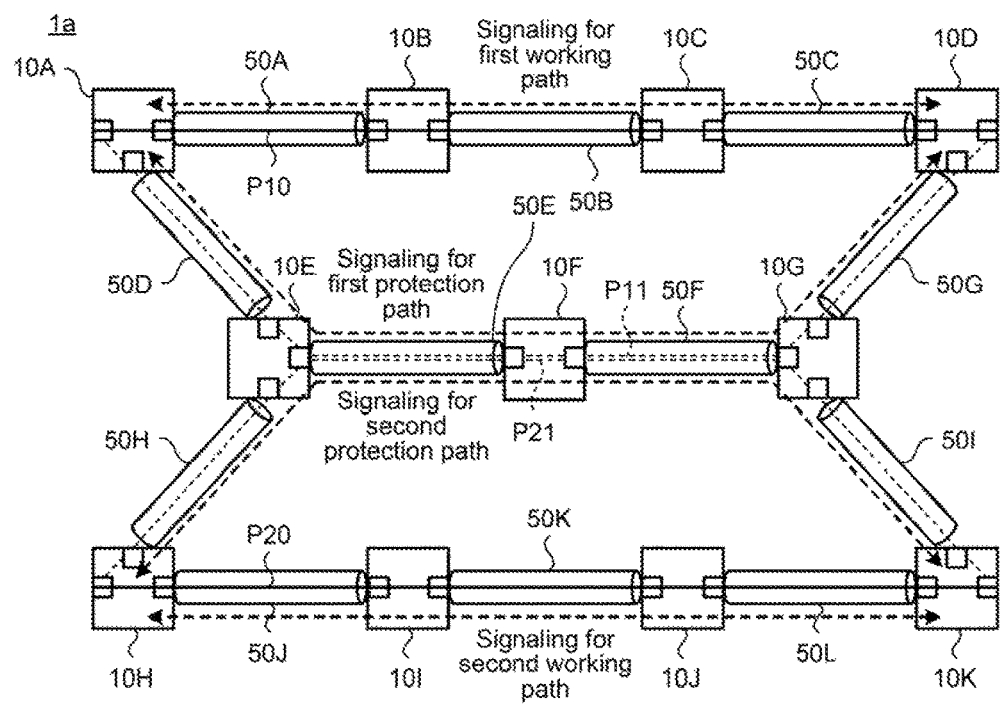
FIG. 12 is an explanatory diagram for explaining the shared mesh restoration according to the existing technology.
Figure 13:
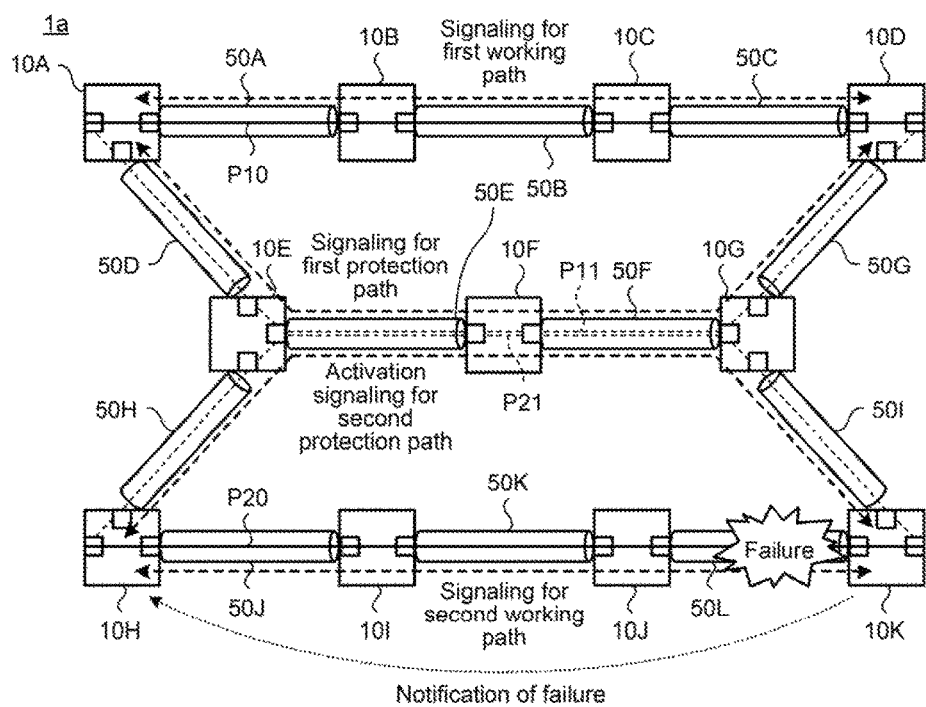
FIG. 13 is an explanatory diagram for explaining the shared mesh restoration according to the existing technology.
Figure 14:
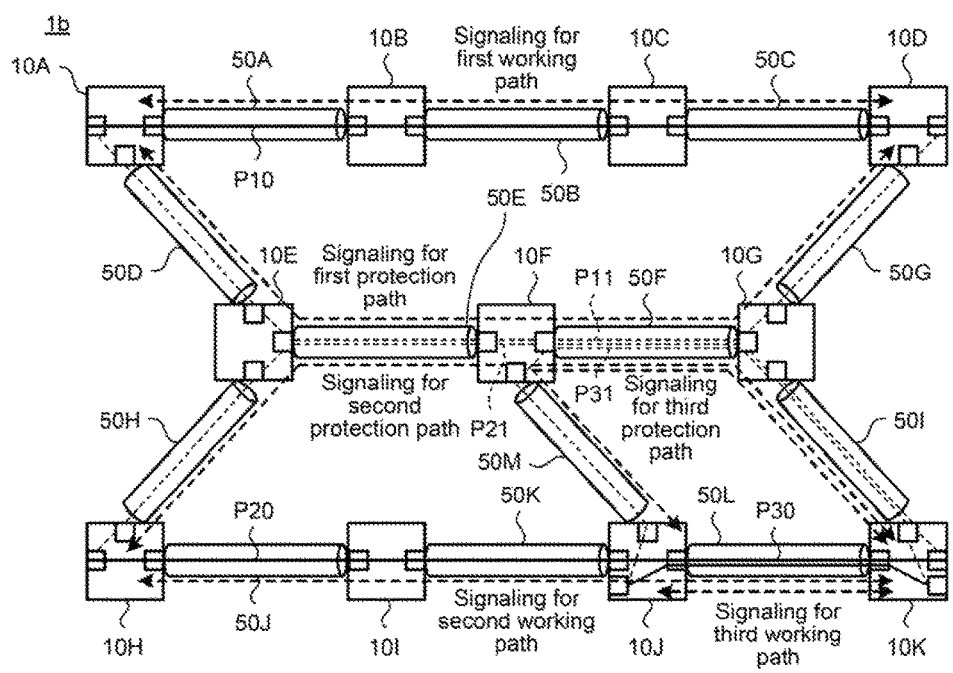
FIG. 14 is an explanatory diagram for explaining the shared mesh restoration according to the existing technology.
Figure 15:
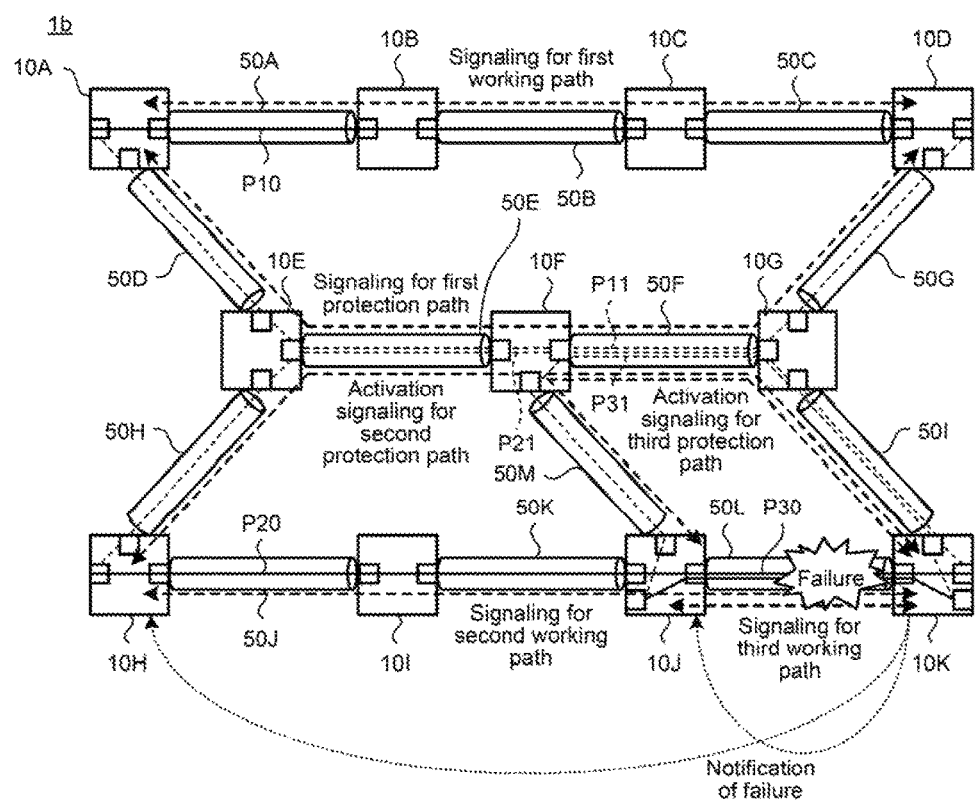
FIG. 15 is an explanatory diagram for explaining the shared mesh restoration according to the existing technology.

Incidentally, the various processes explained in the present embodiment can be implemented by the transmission device executing the previously prepared programs. Therefore, an example of the transmission device that executes a program having the same function as that of the embodiment will be explained below. FIG. 11 is an explanatory diagram illustrating an example of a transmission device 200.

As illustrated in FIG. 11, the transmission device 200 includes a data plane unit 210, a RAM 212, a ROM 214, and a processor 216. The data plane unit 210 communicates with other transmission devices. The processor 216 controls the entire transmission device 200.

The ROM 214 previously stores a transmission program that executes functions similar to these of the embodiment. The transmission program may be recorded in a drive (not illustrated)-readable recording medium, instead of the ROM 214. The recording medium may be a portable recording medium such as CD-ROM, a DVD disc, and a USB memory, and a semiconductor memory such as a flash memory. The transmission program includes a failure prediction program 214A, a node setting program 214B, and a processing program 214C. The failure prediction program 214A, the node setting program 214B, and the processing program 214C may appropriately be integrated or distributed. The RAM 212 stores transmission quality data, path information or route information related to node settings, and the like.

The processor 216 reads the failure prediction program 214A, the node setting program 214B, and the processing program 214C from the ROM 214, and executes the read programs. Thereby, the processor 216 functions as a failure prediction process 216A, a node setting process 216B, and a processing process 216C corresponding to the failure prediction unit 18, the node setting unit 20, and the signaling processing unit 22 respectively.

As one aspect, in the shared mesh restoration, the time for completion of switching when protection paths are activated can be shortened.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A transmission device used for a network that includes a plurality of working paths and a plurality of protection paths bypassing a relevant working path for each working paths, the transmission device comprising:
   a data plane unit that transmits and receives data to and from other transmission devices; and
   a signaling processing unit that performs switching, when a signaling message requesting activation to switch to a first protection path corresponding to a first working path is received, from the first working path to the first protection path, wherein,
   when the first working path is configured as a subset of a second working path and a second protection path corresponding to the second working path is provided,
   the signaling processing unit performs switching from the first working path to the first protection path and performs switching from the second working path to the second protection path.

2. The transmission device according to claim 1, wherein, when a signaling message requesting activation to switch to the second protection path is received after the switching to the first protection path and the switching from the second working path to the second protection path are performed,
   the signaling processing unit returns a response to the signaling message.

3. The transmission device according to claim 1, wherein, when the switching to the first protection path and the switching from the second working path to the second protection path are performed,
   the signaling processing unit transmits the signaling message requesting activation to switch to the second protection path, to the other transmission devices.

4. The transmission device according to claim 1, wherein, when the signaling message requesting activation to switch to the second protection path is not received within a predetermined time after the switching to the first protection path and the switching from the second working path to the second protection path are performed,
   the signaling processing unit returns the switching from the second protection path to the second working path.

5. The transmission device according to claim 3, wherein the signaling processing unit transmits a signaling message including identification information for identifying the second protection path in the signaling message requesting activation to switch to the first protection path, to the other transmission devices.

6. An activation method executed by a transmission device used for a network that includes a plurality of working paths and a plurality of protection paths bypassing a relevant working path for each working paths, the activation method comprising:
   transmitting and receiving data to and from other transmission devices;
   performing switching, when a signaling message requesting activation to switch to a first protection path corresponding to a first working path is received, from the first working path to the first protection path based on the transmission and reception of the data; and
   performing switching, when the first working path is configured as a subset of a second working path and a second protection path corresponding to the second working path is provided, from the first working path to the first protection path and from the second working path to the second protection path.

* * * * *